US012613994B2

(12) United States Patent
Koivu et al.

(10) Patent No.: US 12,613,994 B2
(45) Date of Patent: Apr. 28, 2026

(54) METHODS, SYSTEMS, AND COMPUTER READABLE MEDIA FOR APPLYING PAIRWISE DIFFERENTIAL PRIVACY TO VARIABLES IN A DATA SET

(71) Applicant: Wallac Oy, Turku (FI)

(72) Inventors: Aki Koivu, Waltham, MA (US); Petri Kivelä, Waltham, MA (US); Kim Karlin, Waltham, MA (US); Markku Jaakkola, Waltham, MA (US)

(73) Assignee: WALLAC OY, Turku (FI)

( * ) Notice: Subject to any disclaimer, the term of this patent is extended or adjusted under 35 U.S.C. 154(b) by 408 days.

(21) Appl. No.: 17/969,507

(22) Filed: Oct. 19, 2022

(65) Prior Publication Data

US 2024/0134933 A1 Apr. 25, 2024
US 2024/0232289 A9 Jul. 11, 2024

(51) Int. Cl.
*G06F 21/62* (2013.01)
*G06F 17/18* (2006.01)

(52) U.S. Cl.
CPC .......... *G06F 21/6254* (2013.01); *G06F 17/18* (2013.01); *G06F 21/6245* (2013.01)

(58) Field of Classification Search
CPC ... G06F 17/18; G06F 21/6254; G06F 21/6245
See application file for complete search history.

(56) References Cited

U.S. PATENT DOCUMENTS 7,676,454 B2 3/2010 Dwork et al.
7,698,250 B2 4/2010 Dwork et al.

8,312,273 B2 11/2012 Nice et al.
8,520,842 B2 8/2013 Nice et al.
8,619,984 B2 12/2013 McSherry et al.
(Continued)

FOREIGN PATENT DOCUMENTS

CN 114282083 A * 4/2022
CN 114817971 A 7/2022

OTHER PUBLICATIONS

Machine translation for CN-114282083-A, downloaded 2024 (Year: 2024).*

(Continued)

*Primary Examiner* — John C Kuan
(74) *Attorney, Agent, or Firm* — Jenkins, Taylor & Hunt, P.A.

(57) ABSTRACT

A method for applying pairwise differential privacy to variables in a data set is disclosed. The method includes designating a random instance seed value to a first data set variable in an original data set and designating the random instance seed value to at least one additional data set variable in the original data set if a high degree of correlation is identified between the first data set variable and the at least one additional data set variable. The method further includes determining an adaptive sensitivity parameter corresponding to the first data set variable and utilizing, by a noise generation manager, two or more among the first data set variable, the random instance seed value, and/or the adaptive sensitivity parameter to generate and apply additive noise to the first data set variable to produce a pseudonymized variable for inclusion in a pseudonymized data set associated with the original data set.

18 Claims, 10 Drawing Sheets

1000

(56) References Cited

U.S. PATENT DOCUMENTS

| | | | |
|---|---|---|---|
| 9,672,364 | B2 | 6/2017 | Zhang et al. |
| 10,121,024 | B2 | 11/2018 | Zhang et al. |
| 10,540,519 | B2 | 1/2020 | Zhang et al. |
| 2019/0050599 | A1* | 2/2019 | Canard .................. H04L 9/0861 |
| 2020/0327252 | A1 | 10/2020 | McFall et al. |
| 2022/0277097 | A1* | 9/2022 | Cabot ................... H04W 12/02 |
| 2023/0059367 | A1* | 2/2023 | Lai ...................... G06F 21/6245 |

OTHER PUBLICATIONS

Cheng et al., "Feature Selection for Medical Data Mining: Comparisons of Expert Judgment and Automatic Approaches" Proceedings of the 19th IEEE Symposium on Computer-Based Medical Systems (Year: 2006).*

Zhang et al., "Correlated data in differential privacy: Definition and analysis" Wiley Online Library (Year: 2020).*

Anonymous: "numpy.randon.laplace—NumPy v1.26 Manual," pp. 1-5, XP93116126, https://numpy.org/doc/stable/reference/random/generated/numpy.randon.laplace.html (Dec. 31, 2022).

Desmet et al., "Recent Developments in Privacy-preserving Mining of Clinical Data," ACM/IMS Transactions on Data Science, ACM PUB 27, New York, NY, vol. 2, No. 4 pp. 1-32 (Nov. 15, 2021).

Zhang et al., "Differentially Privacy Data Synthesis," USENIX, The Advanced Computing Systems Association, pp. 1-18 (Apr. 1, 2012).

International Search Report and Written Opinion for PCT Patent Application No. PCT/EP2023/079825 (Jan. 17, 2024).

"Laying Down Harmonised Rules on Artificial Intelligence (Artificial Intelligence Act) and Amending Certain Union Legislative Acts," Regulation of the European Parliament and of the Counsel, Brussels, pp. 1-70 (Apr. 21, 2021).

Battaglia et al., "Differentially Private Distance Learning in Categorical Data," Data Mining and Knowledge Discovery, vol. 35, pp. 2050-2088 (2021).

Zhang et al., "Correlated Differential Privacy: Feature Selection in Machine Learning," Journal of Latex Class Files, arXiv:2010.03094v1, pp. 1-10 (Oct. 7, 2020).

Liu et al., "Reporting guidelines for clinical trial reports for interventions involving artificial intelligence: the CONSORT-AI extension," Nature Medicine, vol. 26, pp. 1364-1374 (Sep. 2020).

Hu et al., "Differential privacy protection method based on published trajectory cross-correlation constraint," PLoS ONE, vol. 15, No. 8, pp. 1-25 (2020).

Kairouz et al., "The Composition Theorem for Differential Privacy," arXiv:1311.0776v4, pp. 1-32 (Dec. 6, 2015).

Naldi et al., "Differential Privacy: An Estimation Theory-Based Method for Choosing Epsilon," arXiv:1510.00917v1, pp. 1-6 (Oct. 4, 2015).

Ji et al., "Differential Privacy and Machine Learning: a Survey and Review," arXiv:1412.7584v1, pp. 1-30 (Dec. 24, 2014).

Dwork et al., "The Algorithmic Foundations of Differential Privacy," Foundations and Trends in Theoretical Computer Science, vol. 9, Nos. 3-4, pp. 1-281 (2014).

Dwork, "Differential Privacy: A Survey of Results," TAMC 2008, LNCS 4978, pp. 1-19 (2008).

Dwork et al., "Calibrating Noise to Sensitivity in Private Data Analysis," Theory of Cryptography, pp. 1-20 (2006).

* cited by examiner

200

```
0. epsilon_val, delta_val, percent_val, t³ =[]
1.  FOR every x row IN t¹ DO:
2.      instance_seed = PseudoRandomGenerator()
3.      FOR every y variable IN x DO:
4.          IF y IN t² DO:
5.              correlated = Unique(t²[Any(y in t²),])
6.              IF y AND correlated NOT IN t³ DO:
7.                  t³ = Append(t³,[y, instance_seed])
8.                  t³ = Append(t³,[correlated, instance_seed])
9.          ELSE:
10.             instance_seed = t³[t³[var,] = y, seed]
11.         result = EpsilonDeltaLaplaceNoise(input=y,seed=instance_seed, eps= epsilon_val,
            del=delta_val, sens=RelativeSensitivity(y,percent_val))
12.         row_result = Append(row_result,result)
13.     t⁴ = Append(t⁴, row_result)
14.     t³ =[]
15. RETURN t⁴
```

| var | seed |
|---|---|
| $x^1$ | 777 |
| $x^2$ | 777 |
| $x^4$ | 777 |

302

| Cor$^1$ | Cor$^2$ |
|---|---|
| $x^1$ | $x^2$ |
| $x^1$ | $x^4$ |
| $x^2$ | $x^4$ |

301

| $x^1$ | $x^2$ | $x^3$ | $x^4$ |
|---|---|---|---|
| 0.04 | 5.12 | 100.1 | 3 |
| 0.02 | 10.24 | 400.2 | 4 |
| ... | ... | ... | ... |

304

| $x^1$ | $x^2$ | $x^3$ | $x^4$ |
|---|---|---|---|
| 0.06 | 5.79 | 100.1 | 4 |
| 0.02 | 10.24 | 398.7 | 4 |
| ... | ... | ... | ... |

FIG. 3

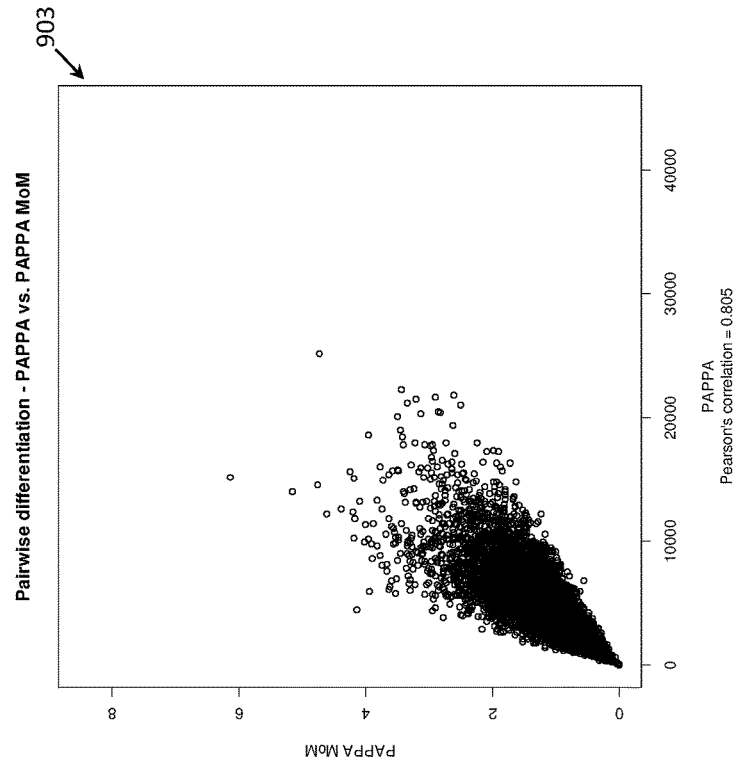
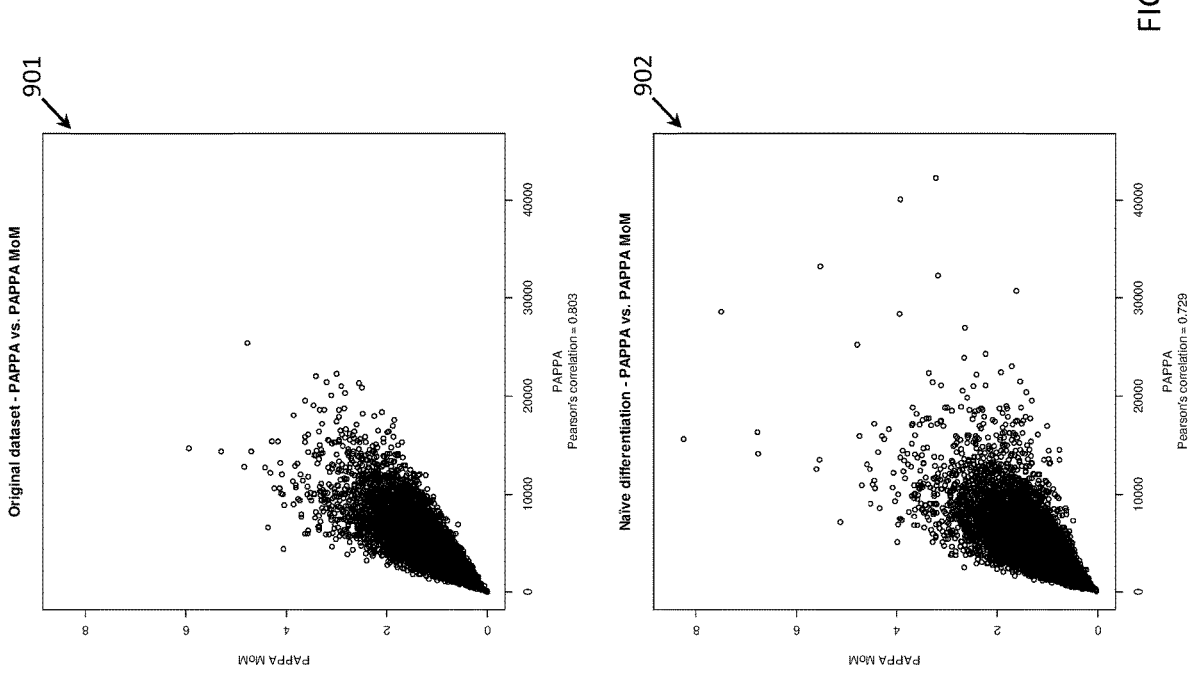
FIG. 9

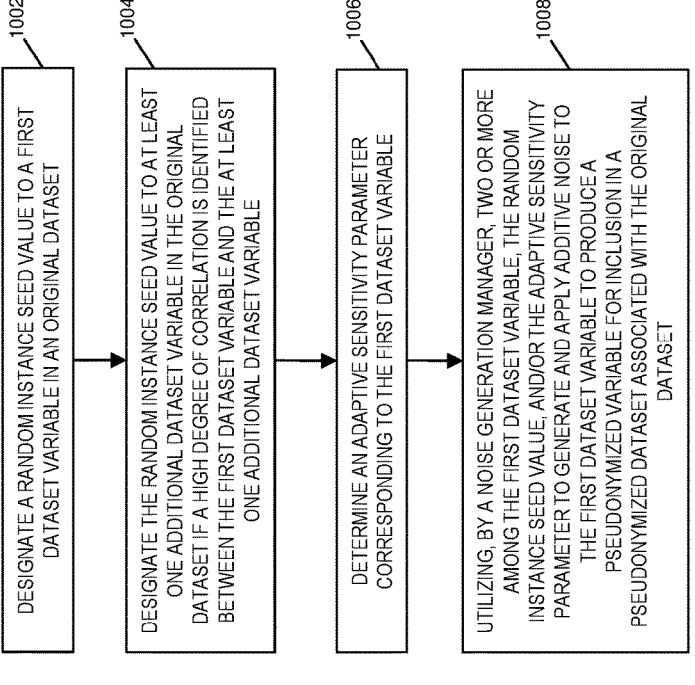

1000

DESIGNATE A RANDOM INSTANCE SEED VALUE TO A FIRST DATASET VARIABLE IN AN ORIGINAL DATASET

1002

DESIGNATE THE RANDOM INSTANCE SEED VALUE TO AT LEAST ONE ADDITIONAL DATASET VARIABLE IN THE ORIGINAL DATASET IF A HIGH DEGREE OF CORRELATION IS IDENTIFIED BETWEEN THE FIRST DATASET VARIABLE AND THE AT LEAST ONE ADDITIONAL DATASET VARIABLE

1004

DETERMINE AN ADAPTIVE SENSITIVITY PARAMETER CORRESPONDING TO THE FIRST DATASET VARIABLE

1006

UTILIZING, BY A NOISE GENERATION MANAGER, TWO OR MORE AMONG THE FIRST DATASET VARIABLE, THE RANDOM INSTANCE SEED VALUE, AND/OR THE ADAPTIVE SENSITIVITY PARAMETER TO GENERATE AND APPLY ADDITIVE NOISE TO THE FIRST DATASET VARIABLE TO PRODUCE A PSEUDONYMIZED VARIABLE FOR INCLUSION IN A PSEUDONYMIZED DATASET ASSOCIATED WITH THE ORIGINAL DATASET

METHODS, SYSTEMS, AND COMPUTER READABLE MEDIA FOR APPLYING PAIRWISE DIFFERENTIAL PRIVACY TO VARIABLES IN A DATA SET

TECHNICAL FIELD

The subject matter described herein relates to data privacy and related noise generation technologies. More particularly, the subject matter described herein relates to methods, systems, and computer readable media for applying pairwise differential privacy to variables in a data set.

BACKGROUND

Differential Privacy is an umbrella term for mathematical methods that implement the functionality of the ε-differential privacy definition. It defines a quantitative measurement for privacy existing in a relational database. Methods that provide ε=1 privacy translates to a privacy guarantee that every entry in a data set has approximately the same level of privacy that would result from having its corresponding data removed entirely. One mathematical method that implements ε-differential privacy is the Laplace mechanism, which generates additive noise that is pseudo-randomly applied to the continuous values of a data set.

Utilizing ε-differential privacy in a real-world situation was promptly determined to be unfeasible in most cases since ε=1 privacy excessively distorts the data in many instances, thus reducing the utility of the modified data beyond an acceptable and/or useful state. Efforts attempting to relax the expectations set by this definition produced "Epsilon Delta" Differential Privacy (i.e., (ε, Δ) Differential Privacy), where an additional parameter, Δ, was added to estimate the maximum probability of a privacy breach occurrence. If the probability is characterized as being 'low' for a particular event, the privacy requirement is more lenient. As such, a (ε, Δ) differentially private Laplace mechanism will create less additive noise when compared to its stricter ε=1 counterpart.

Notably, other proposed methods pertain to the situation where one or more values of the same variable is being operated on. In the domain of life sciences where biochemical and physical measurements are often produced, a unique requirement arises. Specifically, the intercorrelation or the relationships of two or more variables is needed. Measurements obtained from the same sample, e.g., a blood sample analyzed with a mass spectrometer, can have a relation produced by the complex processes of the human body. For example, these processes may interact or interfere with each other during the measurement process. To produce pseudonymization that is intricate enough for life science usage, intercorrelations of the original data need to be addressed.

Accordingly, there exists a need for improved methods and systems for applying pairwise differential privacy to variables in a data set.

SUMMARY

A method for applying pairwise differential privacy to variables in a data set includes designating a random instance seed value to a first data set variable in an original data set. The method further includes designating the random instance seed value to at least one additional data set variable in the original data set if a high degree of correlation is identified between the first data set variable and the at least one additional data set variable. The method further includes determining an adaptive sensitivity parameter corresponding to the first data set variable. The method further includes utilizing, by a noise generation manager, two or more among the first data set variable, the random instance seed value, and/or the adaptive sensitivity parameter to generate and apply additive noise to the first data set variable to produce a pseudonymized variable for inclusion in a pseudonymized data set associated with the original data set.

According to another aspect of the subject matter described herein, the method for applying pairwise differential privacy to variables in a data set is repeated for each remaining data set value included in the original data set.

According to another aspect of the subject matter described herein, the high degree of correlation is identified by an operator.

According to another aspect of the subject matter described herein, the high degree of correlation includes either a high degree of positive correlation or a high degree of negative correlation.

According to another aspect of the subject matter described herein, the first data set variable and the at least one additional data set variable are biochemical data variables associated with a common subject sample.

According to another aspect of the subject matter described herein, the adaptive sensitivity parameter scales with a numerical measurement value associated with the first data set variable.

According to another aspect of the subject matter described herein, the adaptive sensitivity parameter indicates a distribution range of the additive noise applied to the first data set variable.

According to another aspect of the subject matter described herein, the adaptive sensitivity parameter is utilized to establish a magnitude of the additive noise applied to the first data set variable.

According to another aspect of the subject matter described herein, the noise generation manager is a Laplace transform mechanism.

According to another aspect of the subject matter described herein, the original data set includes a relational database. According to another aspect of the subject matter described herein, a system for applying pairwise differential privacy to variables in a data set is provided. The system includes a computing platform including at least one processor and a memory. The system further includes a pairwise differential privacy (PDP) engine that includes a correlation manager and a noise generation manager (NGM) and is stored in the memory and when executed by the at least one processor is configured to: designate, utilizing the correlation manager, a random instance seed value to a first data set variable in an original data set;

designate, utilizing the correlation manager, the random instance seed value to at least one additional data set variable in the original data set if a high degree of correlation is identified between the first data set variable and the at least one additional data set variable; determine, utilizing the correlation manager, an adaptive sensitivity parameter corresponding to the first data set variable; and utilize, via the noise generation manager, two or more among the first data set variable, the random instance seed value, and/or the adaptive sensitivity parameter to generate and apply additive noise to the first data set variable to produce a pseudonymized variable for inclusion in a pseudonymized data set associated with the original data set.

According to another aspect of the subject matter described herein, the correlation manager and the noise generation manager are configured to repeat each act for each remaining data set value included in the original data set.

According to another aspect of the subject matter described herein, wherein the high degree of correlation is identified by an operator.

According to another aspect of the subject matter described herein, the high degree of correlation includes a high degree of positive correlation or a high degree of negative correlation.

According to another aspect of the subject matter described herein, the first data set variable and the at least one additional data set variable are biochemical data variables associated with a common subject sample.

According to another aspect of the subject matter described herein, the adaptive sensitivity parameter scales with a numerical measurement value associated with the first data set variable.

According to another aspect of the subject matter described herein, the adaptive sensitivity parameter indicates a distribution range of the additive noise applied to the first data set variable.

According to another aspect of the subject matter described herein, the adaptive sensitivity parameter is utilized to establish a magnitude of the additive noise applied to the first data set variable.

According to another aspect of the subject matter described herein, the noise generation manager uses a Laplace transform mechanism.

According to another aspect of the subject matter described herein, a non-transitory computer readable medium having stored thereon executable instructions that when executed by a processor of a computer control the computer to perform a method comprising designating a random instance seed value to a first data set variable in an original data set. The method further includes designating the random instance seed value to at least one additional data set variable in the original data set if a high degree of correlation is identified between the first data set variable and the at least one additional data set variable. The method further includes determining an adaptive sensitivity parameter corresponding to the first data set variable. The method further includes utilizing, by a noise generation manager, two or more among the first data set variable, the random instance seed value, and/or the adaptive sensitivity parameter to generate and apply additive noise to the first data set variable to produce a pseudonymized variable for inclusion in a pseudonymized data set associated with the original data set.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 2 illustrates an exemplary pseudocode for applying pairwise differential privacy to variables in a data set;

FIG. 3 illustrates exemplary database tables that are generated and utilized by a pairwise differential privacy engine or algorithm;

FIG. 9 illustrates plots depicting original pregnancy-associated plasma protein A (PAPPA) and PAPPA MoM associations; and FIG. 10 is a flow chart illustrating an exemplary process for applying pairwise differential privacy to variables in a data set.

DETAILED DESCRIPTION

As new data security/confidentiality regulations and standards affecting the software solutions provided to enterprise customers arise, methods that enable software service providers to ensure compliance have become increasingly more important. This is especially true in situations where employees of software service providers are provided access to private data belonging to customers. Generally, there is added value when customers share their data (e.g., for customer support, research and development activities, or the like), however this data-sharing process often imposes a potential threat of leaking private customer data by the software service provider.

For example, unintentional data leakage may occur when email files are shared or when an employee's unlocked laptop is stolen. In these situations, conventional data security methods fail to protect the confidential data of a customer user (e.g., patient) when access to the private data is inappropriately acquired. Reconstruction, database linkage, and re-identification attacks targeted towards confidential patient data within software products need to be addressed.

The present subject matter discloses a pairwise differential privacy method that allows for the preservation of the utility of the data without compromising the underlying source data (e.g., patient data). In particular, the disclosed subject matter pertains to a Pairwise ($\varepsilon$, $\Delta$) Differential Privacy technique, which includes a method for creating pseudonymized data sets from original data sets that are highly intercorrelated. At present, there are no existing methods to preserve patient data privacy while not affecting the utility of the data. In some embodiments, the pseudo-random decision making involved in the methodology is instanced for every individual observation. If an observation contains variables that are known for having intercorrelation (e.g., based on or identified by domain knowledge), the randomness of the applied noise is fixed to a common constant value for each of these correlated variables.

A second aspect of the disclosed subject matter is an extension of the sensitivity parameter, which is commonly derived from domain knowledge. In contrast, the disclosed system utilizes an adaptive sensitivity parameter that scales with the value that is being operated on. In some embodiments, a normalized percentage can be used to implement this functionality.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
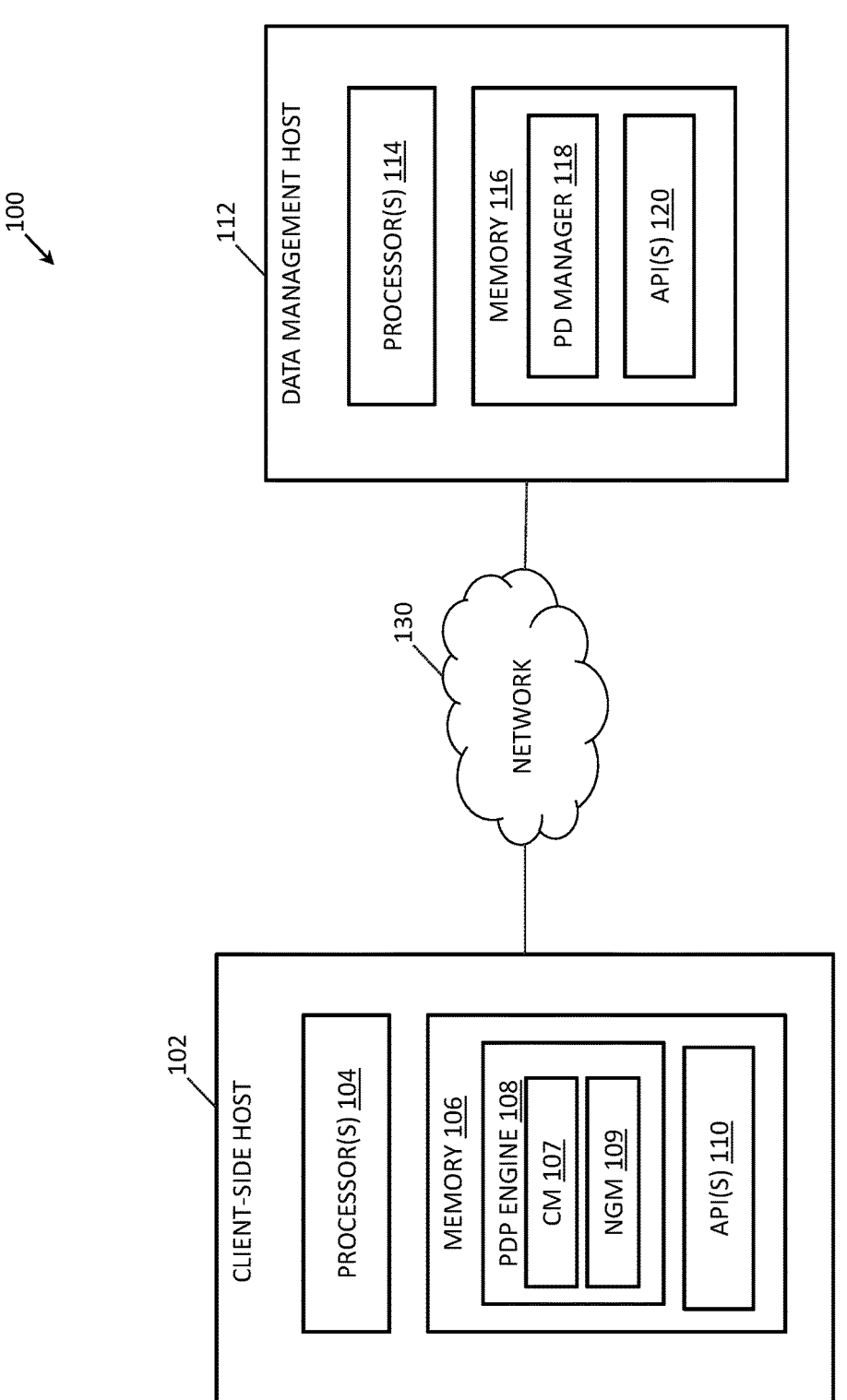
FIG. 1 illustrates an exemplary system configured for applying pairwise differential privacy to variables in a data set.

FIG. 1 illustrates an exemplary system configured for applying pairwise differential privacy to variables in a data set. Namely, FIG. 1 illustrates a system 100 that includes a client-side host 102 and a data management host 112 (e.g., cloud-based software as a service provider) that are communicatively connected by a network 130 (e.g., the Internet). In some embodiments, host 102 may represent any suitable entity or entities (e.g., one or more node(s), device(s), or computing platform(s)) for performing various aspects associated with applying pairwise differential privacy to variables in a data set. In some embodiments, host 102 may represent or include an host server, a personal computer, a laptop computer, a tablet device, or any other suitable computing device that is accessible by a user (e.g., patient or clinician user). As shown in FIG. 1, host 102 includes one or more processors 104 and memory 106. In some embodiments, processor(s) 104 includes a microprocessor, such as a central processing unit (CPU), or any other hardware-based processor unit. Processor 104 is configured to execute and/or utilize software to execute a plurality of software components stored in memory 106. Similarly, memory 106 may include non-transitory computer-readable media, such as disk memory devices, chip memory devices, programmable logic devices, and application specific integrated circuits. Similarly, data management host 112, like host 102, may also include an host server, a personal computer, a laptop computer, a tablet device, or any other suitable computing device that includes one or more processors 114 (not unlike processors 104). Likewise, data management host 112 includes memory 116 that is comparable to memory 106 in host 102.

In FIG. 1, memory 106 contains a pairwise differential privacy (PDP) engine 108 and one or more application programming interface (API) elements 110. In some embodiments, the PDP engine 108 comprises a software program or algorithm that is executed by processor 104 and stored in memory 106. PDP engine 108 may include hardware, software and/or firmware components for implementing the management and execution of applying pairwise differential privacy to variables in a data set as described herein. In one exemplary implementation, PDP engine 108 includes functionality for adding domain-dependent noise in a pseudo-random manner to an unaltered and/or original matrix-like data set (e.g., data set R). Notably, a resulting derivative data set (e.g., data set D) is produced from the original data set being subjected to the pairwise differential privacy processing and/or additive noise of PDP engine 108. In some embodiments, PDP engine 108 comprises a correlation manager (CM) 107 and noise generation manager (NGM) 109. Notably, each of correlation manager 107 and NGM 109 may comprise a software program portion or component of the overall software program (e.g., algorithm, pseudocode, etc.) embodied as PDP engine 108. Further, each of the correlation manager 107 and NGM 109 can also be stored in memory and executed by a processor.

Notably, while customers possess the original, unaltered data R, employees of software service companies receive the D data set from the customer for completing any data-related task. The noise is carefully tailored to be task-specific, so that pseudonymization via differential privacy does not affect the conclusions from said task. As used herein, pseudonymization may refer to a de-identification procedure by which personally identifiable information fields with a data record are replaced by one or more artificial identifiers, or pseudonyms. Thus, even if a third party obtains access to the data set D, this data cannot be automatically linked to the confidential real data set R that is in the customer's possession, thereby increasing data privacy in a passive manner. In data set D, instead of altering every value, only some of the observations contain altered values, thereby qualifying the DP method performed by PDP engine 108 (and/or correlation manager 107) as pseudo-random.

In some embodiments, host 102 may process the customer's original, unaltered data R to derive a D data set, which can be securely transited and/or communicated to a cloud-based service provider host 112 that is adapted for completing any and/or a specific data-related task.

In some embodiments, the noise is carefully tailored to be task-specific by a noise generation manager (NGM) 109 of the PDP engine 108. In particular, the PDP engine 108 and/or NGM 109 is configured to generate noise for conducting pseudonymization via differential privacy in such a manner that the conclusions from the task are not affected. Even if a third party obtains access to the data set D generated by PDP engine 108, this data cannot be automatically linked to the confidential real data set R that remains in the customer's possession, thereby increasing data privacy in a passive manner.

Once data set D is communicated from host 102 to host 112 (e.g., via one or more APIs 110), host 112 is configured to utilize data set D as input for a pseudorandom data (PD) manager 118, which is configured to produce a statistical report. Notably, the statistical report that is produced with the pseudonymized data of data set D will produce the same conclusions that would have been produced by PD manager 118 using original data set R.

One exemplary algorithm or software component that may be executed by PDP engine 108 (and/or correlation manager 107 and NGM 109) is illustrated in FIG. 2 as example pseudocode 200. It is understood that pseudocode 200 can be implemented using any computer code or language (e.g., C# programming language) without deviating from the scope of the disclosed subject matter. In some embodiments, pseudocode 200 may be utilized (e.g., by PDP engine 108 and/or its correlation manager 107 depicted in FIG. 1) to process the original customer data represented in data table 301 ($t^1$) and the correlation preservation data represented in data table 302 ($t^2$). More specifically, original data table 301 includes a plurality of data entries (i.e., rows) of customer data values associated with multiple variables (e.g., $x^1$-$x^4$ columns). Notably, data table 301 contains the original data (e.g., private customer data or R data set) to be pseudorandomized by the PDP engine (e.g., to produce the data set D). In some embodiments, correlation preservation data table 302 is created by a separate analysis and/or provisioned by domain knowledge of an expert or system administrator. Notably, correlation preservation data table 302 may include a system administrator accessible table that designates which variables contained in data table 301 are correlated. For example, the first row in data table 302 indicates that variables $x^1$ and $x^2$ are correlated. The second row in data table 302 indicates that variables $x^1$ and $x^4$ are correlated. The third row in data table 302 indicates that variables $x^2$ and $x^4$ are correlated. Thus, the presence of two (or more) variables in a row in correlation preservation data table 302 indicates that the variables have a high degree of negative or positive correlation, generated by domain knowledge or an expert, a system administrator, or other source of knowledge regarding relationships between the data variables for a particular domain.

FIG. 3 further includes a random seed value table 303 ($t^3$) that includes a plurality of random seed values generated (for variables in table 301) by the PDP engine (and/or its correlation manager). In some embodiments, the PDP engine and/or the correlation manager may be configured to use pseudocode 200 to generate the loop seed value data in data table 303. For example, entries for the random seed value data table 303 are created in lines 7-8 of pseudocode 200. Moreover, data table 304 in FIG. 3 is a differentiated results table that contains differentially private values (i.e., pseudorandomized data values) corresponding to the original data values included in original data table 301. In some embodiments, the PDP engine and/or the correlation manager can provide (at least a portion of) the pseudorandomized data in table 304 to a data management host (e.g., a software as a service provider) for generating a statistical report that produces the same conclusions as if the underlying original data (in table 301) was used.

Returning to FIG. 2, in line 0 of pseudocode 200, the PDP engine and/or the correlation manager can be configured (e.g., by a system administrator) to set or define each of the epsilon value, delta value, and parameter sensitivity percent value to be used in the execution of pseudocode 200. Data table 303 is also reset and/or emptied in line 0. In line 1 of pseudocode 200, the PDP engine (and/or the correlation manager) is configured to execute a looping function that iterates over every row of data table 301. In line 2, the PDP engine includes a pseudo random generator component that is configured to produce an random instance seed value (i.e., 'instance_seed'), which is initially stored in a local buffer.

In lines 3-4 of pseudocode 200, the PDP engine and/or the correlation manager conducts iterative data processing using the original data (e.g., private patient data) in data table 301 and the correlation preservation data (e.g., variable correlations which may be pre-defined by the system administrator) in data table 302. Notably, the PDP engine (and/or the correlation manager) executes lines 3-4 along with line 5 of pseudocode 200 to determine if an original data variable included in data table 301 is similarly included or contained in correlation preservation data table 302. If the PDP engine (and/or the correlation manager) finds a matching entry in data table 302, the PDP engine (and/or the correlation manager) designates the matching variable as a correlated variable (i.e., line 5), thereby determining that some level of correlation is to be preserved. For example, after processing line 5 of pseudocode 200, the PDP engine (and/or the correlation manager) is able to determine that $x^1$ parameter is found in the first two rows of table 302. The PDP engine (and/or the correlation manager) then calculates and/or correlates the variable pairs that contain the $x^1$ variable, which in this example includes correlated data=[$x^2$, $x^4$].

In line 6 of pseudocode 200, table 303 is tested by the PDP engine (and/or the correlation manager) for containing seeds related to parameter $x^1$. During the first iteration of pseudocode 200, data table 303 is initially empty (i.e., the random seed value data table has no data entries yet) before lines 6-8 are executed. In lines 7-8 of pseudocode 200, the PDP engine (and/or the correlation manager) is configured to append new vectors (or value entries) to data table 303. Once lines 6-8 of pseudocode 200 are processed, the PDP engine (and/or the correlation manager) adds one or more rows to data table 303. For example, [$x^1$, instance_seed], [$x^2$, instance_seed], and [$x^4$, instance_seed] are added as row entries to table 303 by the PDP engine. Notably, the random instance seed value previously produced by the pseudo random generator (e.g., see line 2). In this manner, when each of variables $x^2$ and $x^4$ is iterated, their associated seed values are respectively selected from table 303 (e.g., by the PDP engine and/or the correlation manager) such that $x^2$ and $x^4$ use the same random instance seed value as $x^1$ (i.e., since $x^1$ was previously determined to be correlated to $x^2$ and $x^4$). Notably, in pseudocode lines 7-8, the variable and seed value pairs may be appended to the temporary table 303, so that these values can be checked and selected by the IF ELSE structure of pseudocode 200.

In lines 9-10—of pseudocode 200, the PDP engine (and/or the correlation manager) determines that data table 303 contains the current variable being processed and sets the instance seed value to be the previously determined instance seed from table 303, if there already exists an instance seed associated with said variable. Notably, this ELSE structure in lines 9-10 is included because if the previous IF structure is tested to be 'FALSE' (i.e., the iterated variable or any of its correlated variable's record already exists in table 303), then that associated random seed is selected from table 303.

In line 11 of pseudocode 200, the noised result is calculated by the PDP engine (which uses the previously defined (e.g., see line 0) epsilon value, delta value, and percent value parameter value as input for its noise generation manager. In some embodiments, the noise generation manager may include a Laplace mechanism, e.g., a "EpsilonDeltaLaplaceNoise' function, which is configured to apply deterministic noise (i.e., produce a noised output value) dictated by a random seed value in addition to input comprising a value x, an epsilon value, a delta value, a sensitivity value. Notably, the PDP engine further includes a 'RelativeSensitivity' function that receives an "x value" as input, and returns a 'y percentage' value that is representative of a sensitivity level as output. This calculated sensitivity value is further used by the PDP engine as input for determining the noised output value result as mentioned above. In some embodiments, the sensitivity level may be defined by using an adaptive sensitivity parameter that scales with the value that is being operated on. In some embodiments, a normalized percentage can be used by the PDP engine to implement this functionality.

In some embodiments, the noised $x^1$ value is added by the PDP engine to the 'row_result vector' (see, e.g., line 12 of pseudocode 200), which is subsequently appended as a vector entry to the first row (e.g., see line 13) of the differentiated result data table 304 ($t^4$). At this stage (e.g., line 14), random seed value data table 303 is reset by the PDP engine, such that data table 303 can be re-populated for the second row of original data table 301. In line 15 of pseudocode 200, a statistical report representative of select data in table 304 is produced.

Referring to differentiated results data table 304, it should be noted that because each of variables $x^1$, $x^2$, and $x^4$ used the same random seed with the PDP engine's noise generation manager (e.g., the EpsilonDeltaLaplaceNoise function), the noise added to each of these variables is the same, relative to the value that was differentiated. The 'up arrows' illustrated in data table 304 indicate that the each of the $x^1$, $x^2$, and $x^4$ variables had the same amount of noise applied.

Returning to FIG. 1, PDP engine 108 may select at least a portion of the resultant pseudorandomized data produced in data table 304 and send it to data management host 112 using API 110. Likewise, host 112 includes a pseudorandom data (PD) manager 118 that is configured to receive the pseudorandomized data produced by PDP engine 108. In particular, PD manager 118 is configured to utilize the pseudorandomized data received from host 102 (e.g., via API 120) to produce a statistical report. Notably, the statistical report may include the same information and/or conclusions that would have been produced if the original data processed by PDP engine 108 was utilized by PD manager 118.

The disclosed subject matter is further directed to adding differential privacy functionality to a software product's customer service process, e.g., a laboratory data management and statistical service. For example, the disclosed subject matter may be optimally utilized under the following conditions:

First trimester screening data is sent from the customer lab (e.g., a client-side host computer) to a statistics team (e.g., software service provider host computer) for evaluation. The sending of this screening data may be triggered in response to a customer inquiry regarding the quality of (private) biomarker data possessed by the customer.

The customer is primarily concerned by trends, such as increased variation or level difference over time, and less concerned about an individual observation. One task of a statistician is to investigate these population-level summary statistics and provide a statistical report to the customer.

While the "statistical export" version of the received data does not include easy identifiable information (e.g., customer name and social security number), the data often contains numerical information that is potentially identifiable. This is the information differential privacy is designed to anonymize in a sufficient manner.

The cloud capacities of the laboratory data management software enable operators to implement a differential privacy solution to the existing customer's client-side application (e.g., the PDP engine at the client side host), so that pseudonymization is done locally, and anonymized data is pushed to the cloud storage associated with the software service provider host.

Methods and Materials

In some embodiments, the "statistical export" file designed for private original data collection may include 10,000 observation batches that contain multiple variables, some of these variables are used in first trimester risk prediction while other variables constitute additional information. The statistical export file also contains different data types, which is important in terms of differential privacy, as different mechanisms can be utilized for different data types. Also, altering some variables have a more significant impact to the conclusion of the statistical investigation than other variables. For example, changing the categorical encoding for ethnicity (e.g. "1" for Caucasian could be changed to "2" for East Asian) in order to add pseudonymization has a significant effect as to of how the risk modelling is performed, thereby altering the overall risk score significantly. This is not the case for numerical variables such as biomarker multiple-of-the-medians (MoMs), where an appropriately sized deviation does not significantly alter the risk score outcome in a notable way. In some instances, MoM represents a biomarker concentration/patient population median or a more intricate formula that takes into account gestational age (GA). Notably, specific biomarkers have specific MoM formulas.

As such, only the following numerical variables were considered for the differential privacy pseudonymization in this example:

Measurements related to pregnancy
  GA (gestational age)
  BPD (biparietal diameter)
  BPD2 (Twin)
  CRL (crown rump length)
  CRL2 (Twin)
  HC (head circumference)
  HC2 (Twin)
  LMP (last menstrual period)
  Mother's age
  Mother's weight
Biomarkers and biophysical measurements
  AFP (alpha-fetoprotein)
  hCG (human chorionic gonadotropin)
  hCGb (human chorionic gonadotropin, beta subunit)
  uE3 (unconjugated estriol)
  PAPPA (pregnancy-associated plasma protein A)
  Inhibin-A
  NT (nuchal translucency)
  NT2 (Twin)
  uE3Upd (unconjugated estriol)
  PIGF (placental growth factor)
  MAP (mean arterial pressure)
  UTPi (uterine artery pulsatility index)
  sFlt1 (soluble fms-like tyrosine kinase 1)
  AFP MoM
  HCG MoM
  HCGb MoM
  uE3 MoM
  PAPPA MoM
  Inhibin-A MoM
  NT MoM
  uE3Upd MoM
  PIGF MoM
  MAP MoM
  UTPi MoM
  sFlt1 MoM One feasible method for implementing differential privacy for continuous variables is using the Laplace mechanism, where noise generated from the Laplace distribution can be added to a value. It follows the definition of a differentially private mechanism. Differential privacy in its current form of "Epsilon-delta differential privacy" utilizes three parameters: a $\Delta$ value parameter, an $\varepsilon$ value parameter, and iii) an adaptive sensitivity value parameter (or percentage). These parameters should be selected based on their applicability to the task related to pseudonymization, which in this scenario is a laboratory data statistical service. Delta, or $\Delta$, may represent an (estimated) probability of a data leak in a system, and in some embodiments can be assigned as:

$$\Delta = 1/\text{data observations,}$$

which implements the more practical $(\varepsilon, \Delta)$ differential privacy, as opposed of the stricter $(\varepsilon, 0)$ differential privacy with limited real-world application. Following this, $\Delta$ was fixed as 0.0001 for all experiments. Epsilon, or $\varepsilon$, directly affects the amount of anonymity that is preserved, as $\varepsilon$ may represent the privacy budget available (and/or privacy budget upper limit). In many embodiments, one may use $\varepsilon$ equal to 1. As such, this parameter can be fixed to be equal to 1. Sensitivity, a parameter determining the amount of added relative noise, may also be iteratively determined during the study. In some embodiments, statistical analysis software R an RStudio can be used to produce various outputs.

Experimental Results

Figure 4:
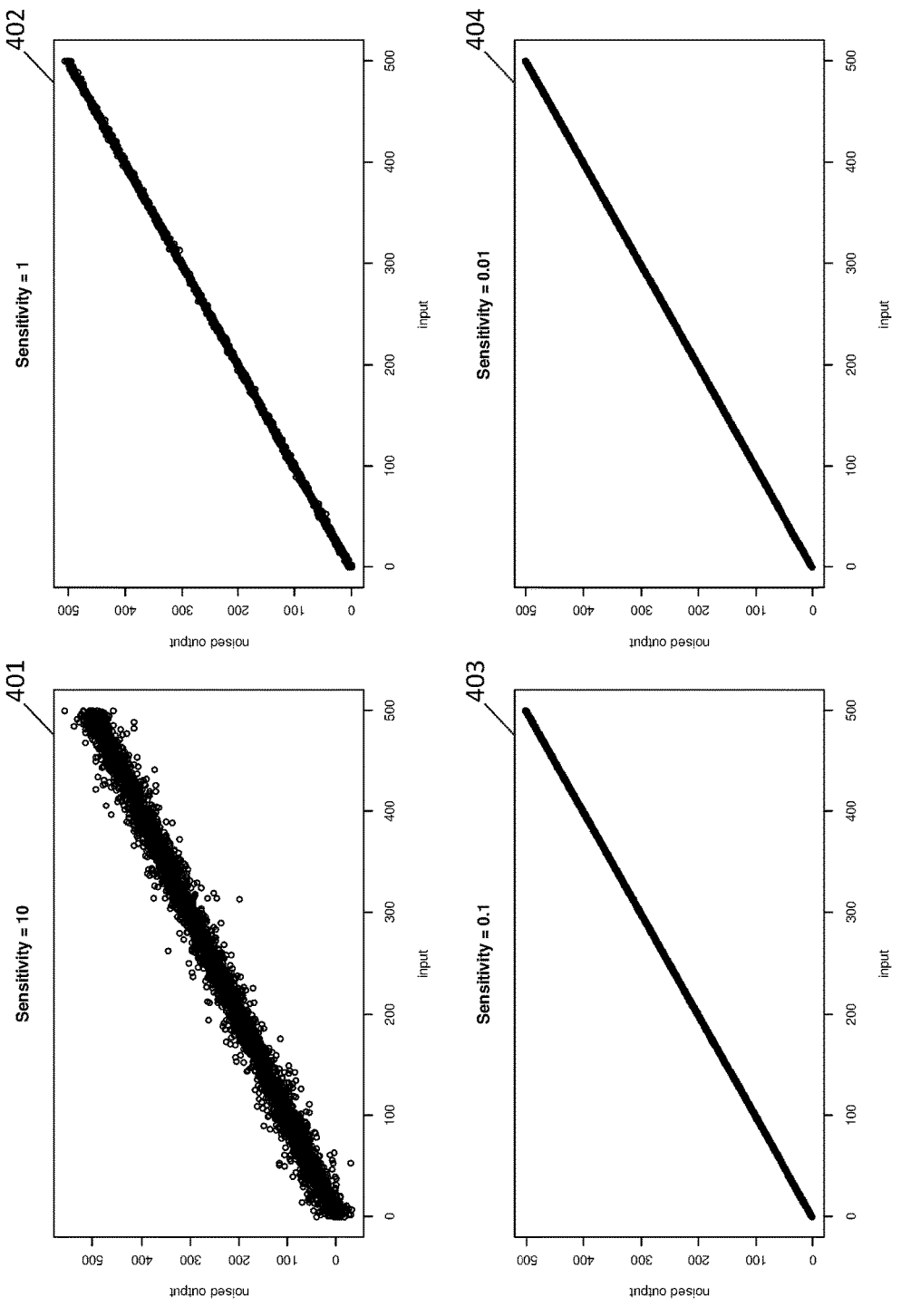
FIG. 4 illustrates graphs depicting sensitivity value testing with experimental data.

Given simplistic toy data of one continuous variable, a first iteration of code was written. An additive Laplace noise function was written in R, which supported the (ε, Δ) differential privacy parameters of ε, Δ, and sensitivity. In some embodiments, ε and Δ were fixed, so the initial testing concerned determining the proper value for the sensitivity parameter. FIG. 4 showcases sensitivity values of different magnitudes, from which sensitivity of 10 was deemed too extreme to be used with any type of biomarker data, as it generates too much variation between real and derived. In particular, FIG. 4 illustrates graphs 401-404, each of which depicts the use of a different sensitivity value testing. For example, graph 401 illustrates a sensitivity value testing with the sensitivity value set to 10. Similarly, graph 402 illustrates the use of a sensitivity value equal to 1, graph 403 illustrates the use of a sensitivity value equal to 0.1, and graph 404 illustrates the use of a sensitivity value equal to 0.01. Notably, the lower the sensitivity value used, the less deviation of the resulting data exhibits.

At this point the design restriction of different variables were fully realized, as MoM values that reside approximately between the (0,20] range have a larger restriction on noise when compared to biomarker concentrations and demographic information. For example, MoM values near 1 are considered normal, while values greater than 1 are deemed elevated when compared to the patient median. Moreover, less than 1 and greater than zero are considered decreased when compared to the patient median. So, while on the "positive" side (e.g., greater than 1), the MoM behavior is linear in a way of deviation from the patient median, while the "negative" side of 0<x<1 behaves non-linearly, due to the division in the MoM formula. This means that the additive noise mechanism needs to address this, and not use a fixed sensitivity parameter. In additions, transitions from the "positive" side to the "negative" side are not allowed due to the added noise. Notably, MoM values of (0, . . . , 1) cannot be changed to >1, and (1, . . . , +∞] cannot be changed to <1, however values in [0.95, . . . , 1) and (1, . . . , 1.05] can be transformed into 1 after rounding. This information indicates that the amount of positive or negative noise should be relative to the value that is operated upon.

The second iteration may contain a conditional structure of Sensitivity, where:

1. If the value is <10, Sensitivity=0.05. Else:
2. If the value is >=10 and <1000, Sensitivity is 0.5. Else:
3. If the value is >=1000, Sensitivity is 5.

Figure 5:
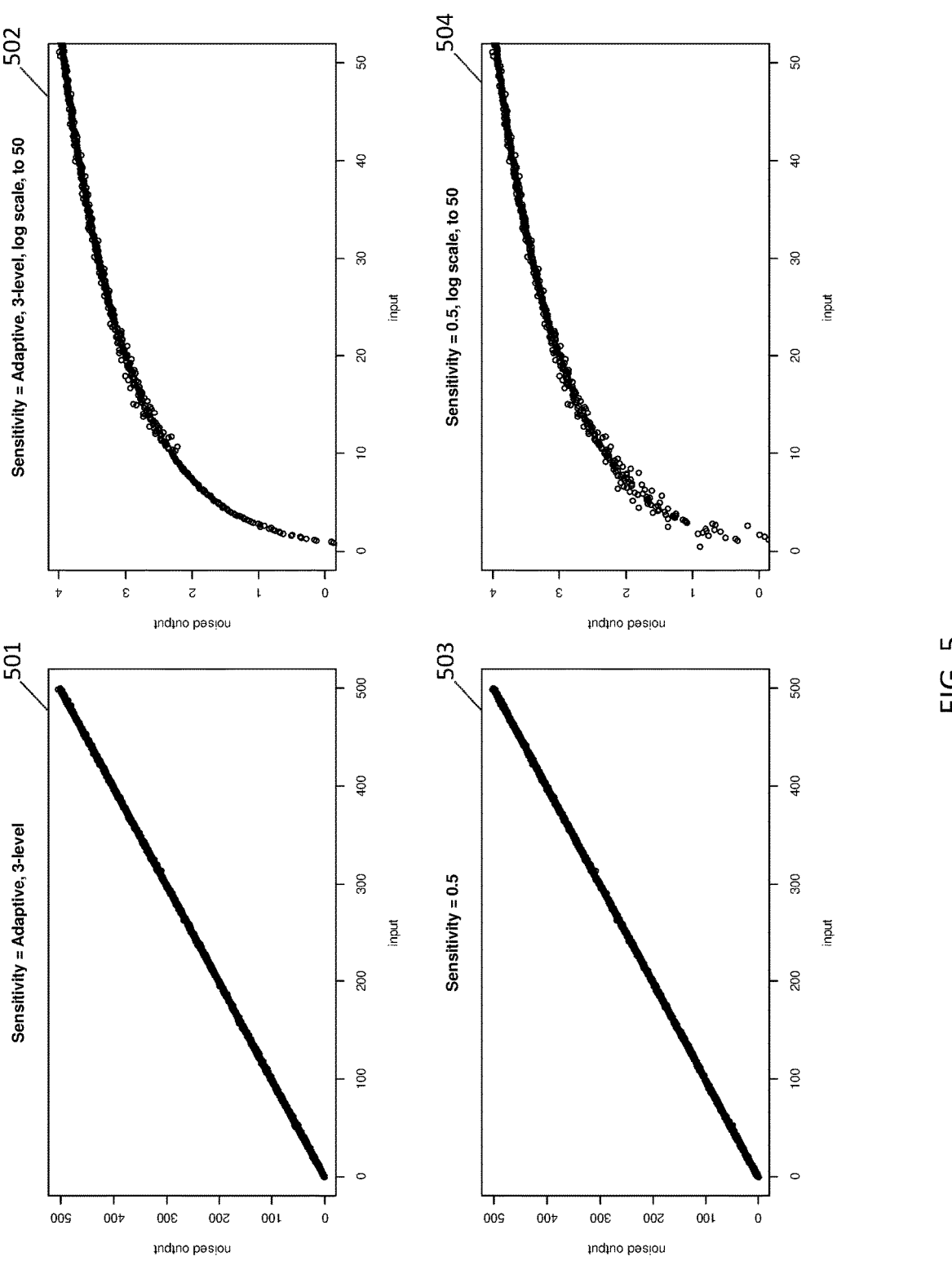
FIG. 5 illustrates graphs depicting adaptive 3-level sensitivity versus fixed sensitivity.

This resulted in a more adaptive noise addition compared to fixed one as shown in FIG. 5. In particular, graphs 501-504 illustrate examples of Adaptive 3-level Sensitivity vs. fixed sensitivity to 0.5. As the Sensitivity of 0.5 starts being too large for values near 1, the deviation from real increases to unacceptable proportions, while the 3-level uses a Sensitivity of 0.05 near values of 1. For example, FIG. 5 shows the improvement of decreased deviation near 1, however it introduces crude ladders in terms of deviation, which is evident in FIG. 5, "Sensitivity=Adaptive, 3-level, log scale, to 50" subplot (i.e., graph 502), range after input of 10. In order to increase adaptability and generalizability (e.g., the IF ELSE structure might not be applicable to other products), Sensitivity would be determined as a relative percentage of the value to be anonymized.

Figure 6:
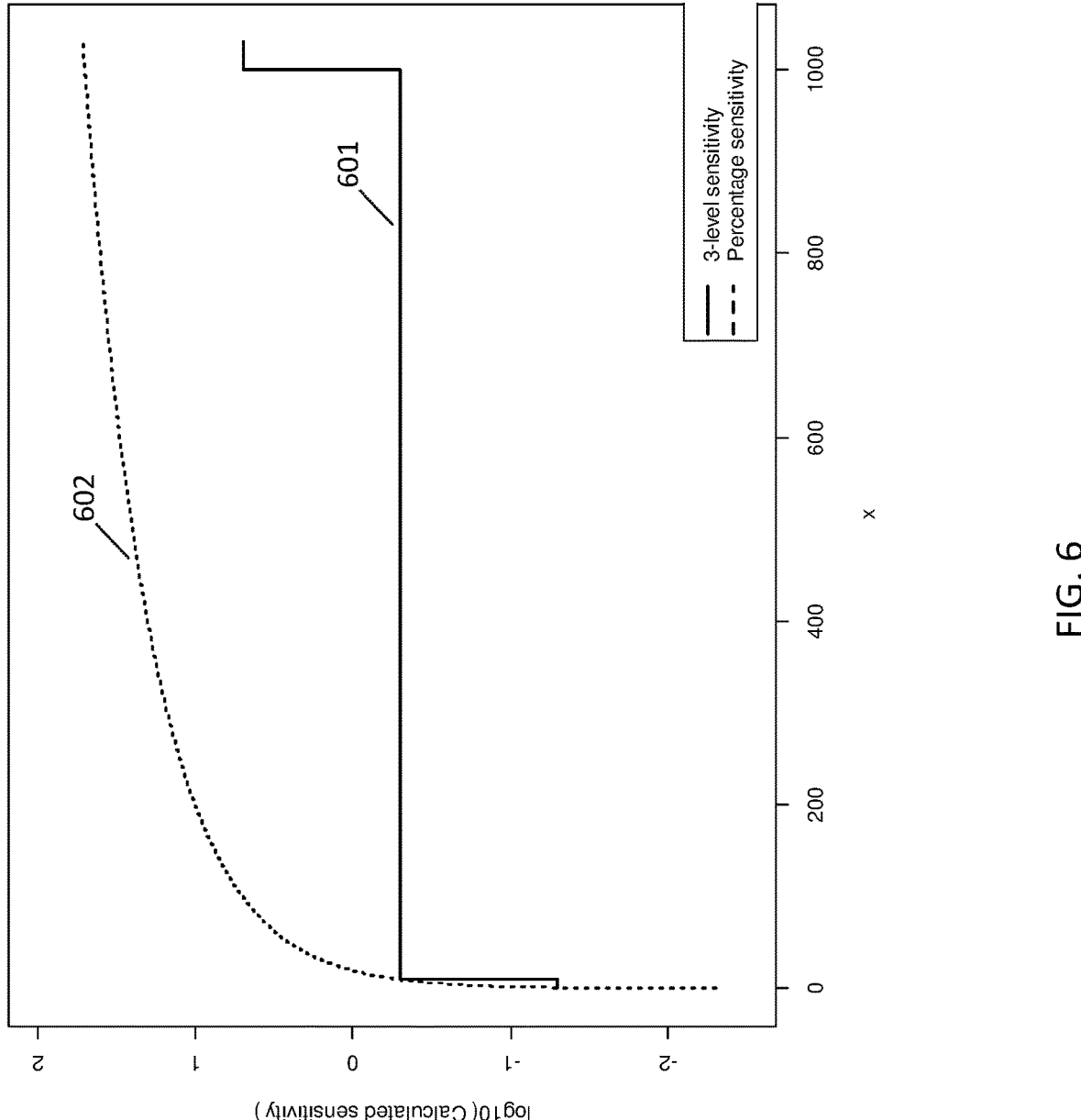
FIG. 6 illustrates a graph depicting 3-level sensitivity versus percentage sensitivity.

FIG. 6 shows that the Sensitivity relative to the value behaves similarly at the first two ladder steps of the 3-level mechanism, however the amount of noise added is increased after values of 10 or higher. Notably, 5% of added noise is more intuitive when compared to an arbitrary IF ELSE structure, and it can be demonstrated that it does not break the rules related to MoM values. Referring to FIG. 6, 3-level Sensitivity represented by line 601 vs. Percentage Sensitivity of 5% represented by line 602. In FIG. 6, the y-axis is represented in log scale since it demonstrates the more dynamic behavior of the percentage mechanism.

At this point during experimentation, the Sensitivity mechanism was performing feasibly with the fake/experimental data set, so the first round of experimentation with the real data set was completed. In some embodiments, a subjective assessment by a domain expert may be used to evaluate the differential privacy method. For example, the statistician can generate reports with real and fake data and investigate if the same conclusions can be achieved using both data sets. The ε parameter was of interest at this stage, so the statistician generated three (3) reports with differing ε values:

The statistical report with the original data
The statistical report with derived data, using ε=2
The statistical report with derived data, using ε=4

Figure 7:
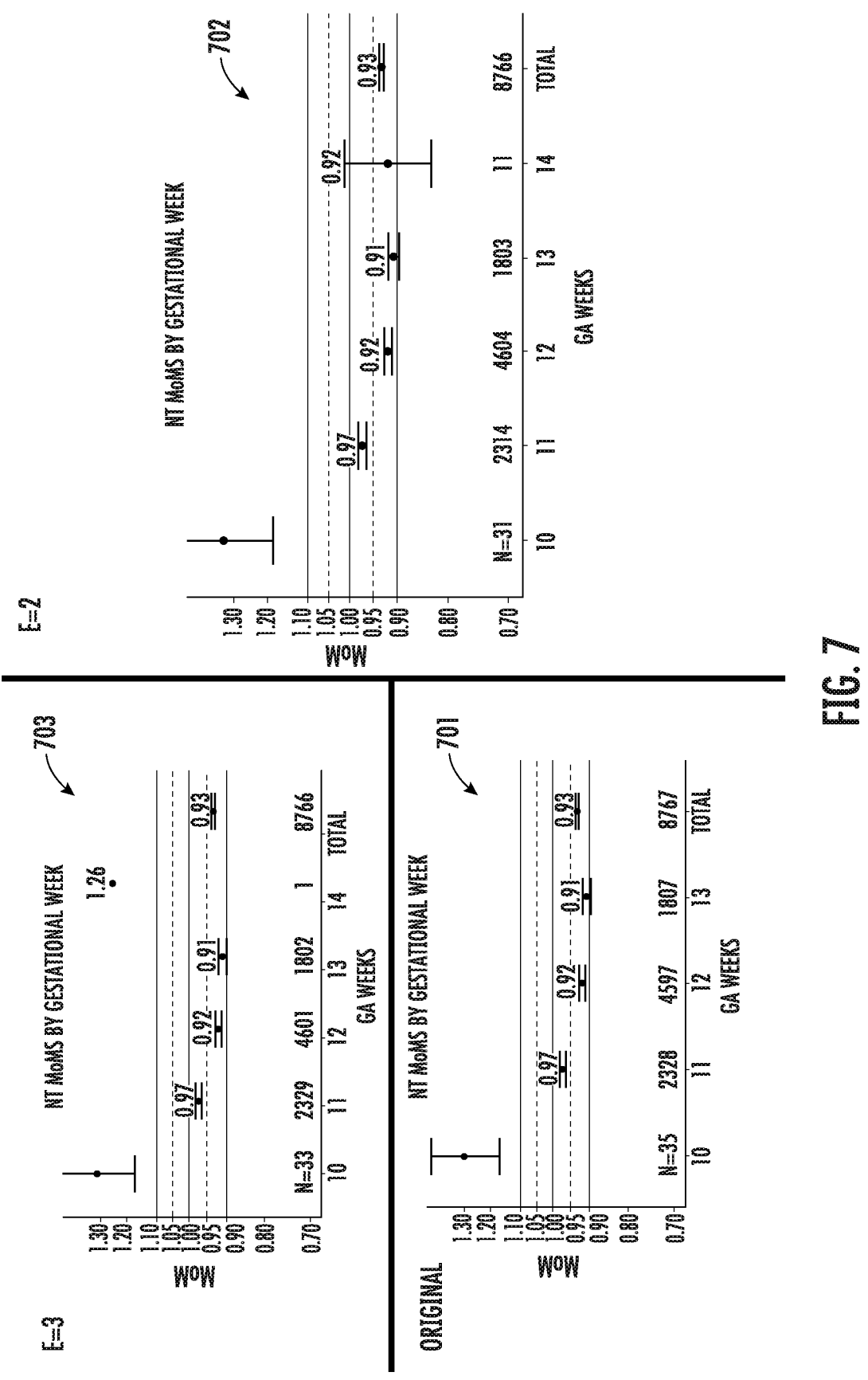
FIG. 7 illustrates plots depicting example nuchal translucency (NT) multiple-of-the-median (MOM) summaries for various data sources.

Notably, gestational age (GA) can be used to group biomarker results, however when it is differentiated, this creates groups not originally present in the data set. FIG. 7 demonstrates this with NT MoM, risk re-calculation is highly affected by this deviation from the original data. FIG. 7 illustrates plots 701-703, which provide NT MoM summaries of the original data (e.g., plot 701) and ε=2 (e.g., plot 702) and ε=3 (e.g., plot 703) differentiated data. Notably, the pseudonymization created a new GA week group that was not in the real data.

Figure 8:
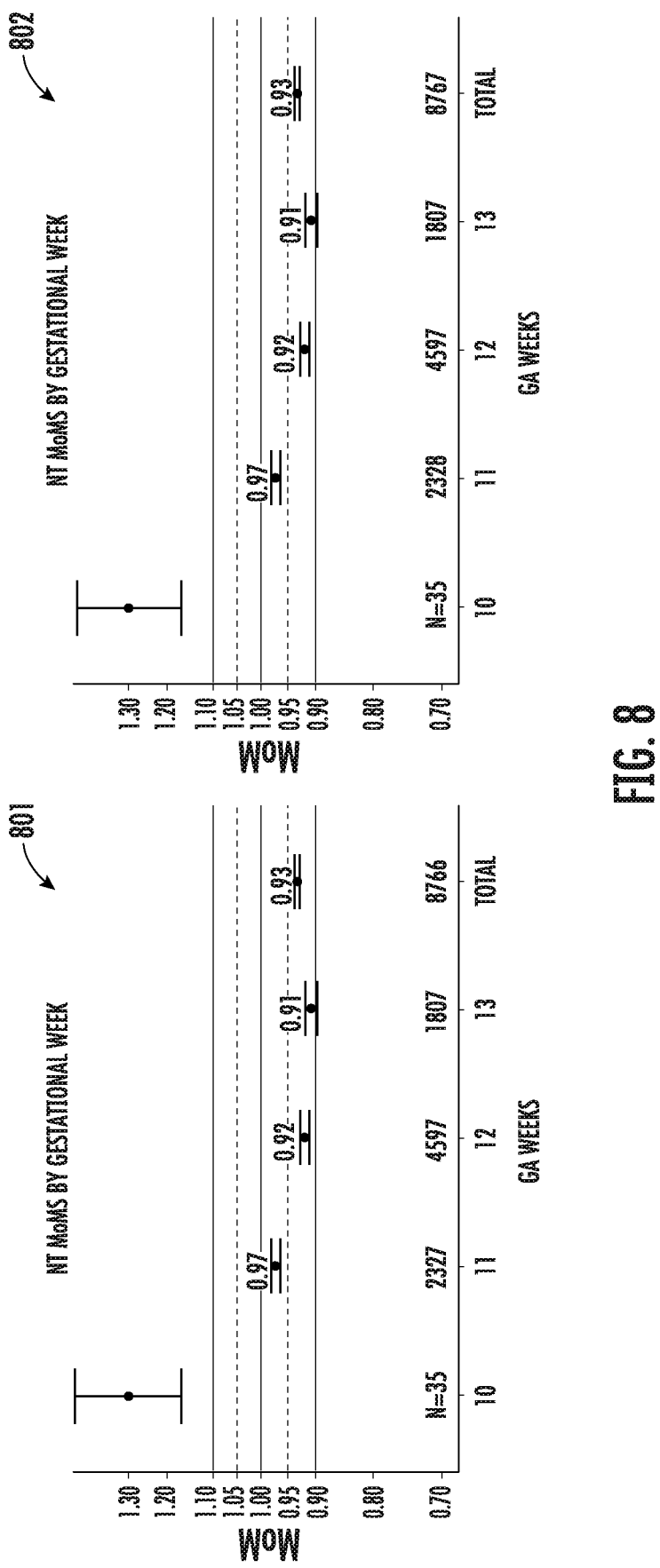
FIG. 8 illustrates plots depicting NT MoM summaries of original data and $\varepsilon=1$ data with no gestational age (GA) pseudonymization.

In particular, the following variables were set to not be anonymized: "BPD", "BPD2", "CRL", "CRL2", "HC", "HC2", "gestational age", and "LMP". The statistical report was recalculated, now with ε=1 since ε=2 was still feasible, so the limit of this parameter was also investigated. FIG. 8 illustrates the differences between the new iteration and the report completed with the original data. The summaries by GA week are nearly identical, and it was confirmed that the same outcomes for all biomarkers were achieved with the original and the anonymized data sets. Moreover, ε=1 was also deemed appropriate for this experiment. In FIG. 8, plot 801 illustrates an NT MoM summary of ε=1 data (i.e., stricter than 2 or 4) with no GA pseudonymization, while plot 802 depicts an NT MoM summary of the original data. Notably, the summaries are nearly identical.

In some embodiments, the sensitivity mechanism can be reworked to produce additive noise of +–3%. This was mainly due to requirements set by altering MoM values, so that transitions from positive side to negative of MoM=1 (and vice versa) could not be calculated. For example, MoM=1.05 and 0.95 (small positive & negative effect) cannot be rounded to 1 after 3% differentiation. The report was recalculated and checked that the conclusions did not change.

In this stage of experimentation, it was noticed that a biomarker can be represented as multiple variables, the concentration, and the MoM result (and derivates of MoM, such as Log MoM). The noise generation manager (e.g., Laplace mechanism) was not aware of this relation and could in theory generate a situation where 3% of positive noise would be added to a patient's concentration result, and 3% of negative noise would be added to the MoM result. This breaks the association that a concentration and MoM values may have. Correction to this was to use pairwise differentiation, where the same random seed would be used for both values within one patient, thus generating deviation of same magnitude and direction.

New derived data set was created using the pairwise mechanism, and the statistical report was re-created. Overall conclusions did not change, which was expected as concentrations are not inspected in the reporting procedure. After this inspection, the correlation was used to look at if the pairwise mechanism preserved the relationship of a biomarker's concentration and MoM. In FIG. 9, the method that does not take the associations into account reduces the correlation of pregnancy-associated plasma protein A (PAPPA) and PAPPA MoM by 7.4%, while the disclosed pairwise mechanism (e.g., PDP engine) reduces the correlation by a negligible 0.2%. The result demonstrates the feasibility of the disclosed subject matter. In particular, FIG. 9 illustrates original PAPPA concentration vs. PAPPA MoM association (plot 901) compared against the naïve differentiation (plot 902) and pairwise differentiation (plot 903). Notably, pairwise differentiation does not alter the correlation in a significant way (0.2%), while the naïve method changes the correlation by 7.4%.

In some embodiments, the disclosed subject matter (e.g., PDP engine 108 in FIG. 1) can be configured to identify and support both positive correlations and negative correlations. Notably, the type of correlation employed or identified depends on the analysis required by the use case or problem being addressed by an operator (e.g., whether the preservation of a negative or positive association of two or more variables is needed and/or preferred). For example, one application may require preserving a high degree of positive correlation of BMI and a certain biomarker, while another application may want to preserve a high degree of negative correlation of a subject/patient's age and a designated biomarker.

Exemplary Implementation

In some embodiments, program parameters (e.g., parameters for pseudocode 200 and/or the PDP engine) may be stored in a JSON file. As indicated above, program parameters may include $\Delta$, $\varepsilon$, and Sensitivity (e.g., either including three values and two threshold values or a single percentage value). The parameters may also include a list of differential privacy column names and a list of differential privacy groups, so that each group contains the names of those differential privacy columns that are to have the same noise percentage applied. A differential privacy column can belong to at most one differential privacy group, but it need not belong to any group. A separate non-differential privacy column may be specified to be the primary key column and all its values must be unique. For example, its column name does not appear in the list of differential privacy column names.

In some embodiments, the program (e.g., pseudocode 200 and/or the PDP engine) may read a CSV file one line at a time. The first line in the file contains column names that are used to map configuration data to column indexes. For each line, the value of the primary key column is retrieved, and its SHA256 hash value is calculated (e.g., by the PDP engine). The first few bytes of the hash are converted by the PDP engine to an integer, which can be used to seed a random number generator for this line. Notably, this primary key column can later either be removed or its values can be replaced with their hash values. As such, the customer site can repeat the anonymization and obtain the same results, but the original values cannot be retrieved from the results.

In some embodiments, all the differential privacy columns (and values) are processed by the PDP engine in the order that the columns appear in the JSON file. If some column value is empty or cannot be converted to a double value, that value is left intact since it might contain, for example, the string "N/A" to indicate a missing value. If conversion succeeds, then the original string representation of the column value is inspected to find out if i) the value is an integer value without a decimal point, ii) a real value expressed in exponential notation, or iii) a real value with a decimal point and a fractional part but without an exponent. For a real number without an exponent, the PDP engine determines the number of its decimals. Likewise, for a real number with an exponent, its precision is determined. After noise has been applied to the value by the PDP engine (and/or its noise generation manager), the pseudorandomized value is converted to a string so that it has the same format as the associated original data value.

If a differential privacy column does not belong to any group, then the random number generator instance for the line being processed is used to generate a noise percentage using the configured $\Delta$, $\varepsilon$, and Sensitivity. In some embodiments, the sensitivity may be calculated by the PDP engine as a fixed percentage of the input value. However, if the differential privacy column belongs to a group, then the column is first checked to determine if a noise percentage for this group has been already calculated. In some embodiments, each line in the CSV file may have a dictionary of group names and their respective noise percentages. If a noise percentage has not yet been calculated for this group and line, then a new noise percentage is calculated by the PDP engine (and/or noise generation manager) in the same manner as columns that do not belong to any group. The PDP engine (and/or noise generation manager) may then add this noise value to the dictionary, so that the value can be found for other columns in this group, while this line is being processed.

Notably, a differential privacy column value cannot become zero or negative after noise has been applied. If this occurred, then a new random noise percentage is calculated by the PDP engine (and/or noise generation manager) until the result is positive.

FIG. 10 is a flow chart illustrating an example process for applying pairwise differential privacy to variables in a data set according to an embodiment of the subject matter described herein. In some embodiments, method 1000 depicted in FIG. 10 may be an algorithm, program, pseudocode (e.g., pseudocode 200 in FIG. 2), or script stored in memory that when executed by a processor performs the steps recited in blocks 1002-1008. In some embodiments, method 1000 represents a list of steps embodied via software code programming and/or the logic of the PDP engine.

In block 1002, method 1000 includes designating a random instance seed value to a first data set variable in an original data set. In some embodiments, the PDP engine (and/or its correlation manager) is configured to calculate a random instance seed value. For example, the PDP engine may generate the random instance seed value for every row of an original data table (e.g., table 301 in FIG. 3).

In block 1004, method 1000 includes designating the random instance seed value to at least one additional data set variable in the original data set if a high degree of correlation is identified between the first data set variable and the at least one additional data set variable. In some embodiments, the PDP engine (and/or the correlation manager) accesses a correlation preservation table (e.g., table 302 in FIG. 3) that includes data entries that indicate the correlation among different data set variables (e.g., vector parameters). For example, correlation preservation table 302 can be provisioned by a system administrator that has access to domain knowledge that permits the administrator to define the vector parameter correlations. In some embodiments, the high degree of correlation may include either a high degree of positive correlation or negative correlation that is identified by an operator. When the PDP engine or correlation manager finds two or more variables in the same row in correlation preservation table 302, the PDP engine or correlation manager may identify that a high degree of correlation is present among the variables. Thus, determining whether a high degree of correlation exits among variables may include the PDP engine or correlation manager performing a lookup in correlation preservation table 302 to determine whether the first data set variable identified in step 1002 is present in any of the rows of correlation preservation table 302 and therefore highly correlated with any other variables in the same row.

In block 1006, method 1000 includes determining an adaptive sensitivity parameter corresponding to the first data set variable. In some embodiments, the PDP engine (and/or the correlation manager) is configured to determine an adaptive sensitivity parameter by scaling the sensitivity value relative to the magnitude of the value that is being operated on. In some embodiments, the PDP engine (and/or the correlation manager) may be configured to determine the adaptive sensitivity parameter as a normalized percentage value along with the ε value and the Δ value for each vector variable processed. In some embodiments, the adaptive sensitivity parameter is quantified as a percentage.

In block 1008, method 1000 includes utilizing, by a noise generation manager (and/or PDP engine), two or more among the first data set variable, the random instance seed value, and/or the adaptive sensitivity parameter to generate and apply additive noise to the first data set variable to produce a pseudonymized variable for inclusion in a pseudonymized data set associated with the original data set.

In some embodiments, blocks 1002-1008 are repeated by the PDP engine in order to generate all of the pseudo-randomized data that is provisioned in the differentiated data table (e.g., data table 304 in FIG. 3). Once the pseudo-randomized data is generated, at least a portion of the data is sent by the PDP engine to a data management server. Notably, the data management server may subsequently generate a statistical report using the received pseudo-randomized data.

As described above, the disclosed subject matter enables a PDP engine to produce pseudorandomized data that can be used by a data management entity to securely produce a statistical report. Notably, the use of the pseudorandomized data in this manner may generate the same conclusions when compared to the original data. However, with differential privacy the amount of privacy risk within the data set is significantly reduced. Notably, the disclosed subject matter provides a sensitivity mechanism applicable to other products and situations, thereby creating a proper set of default parameters for any differential privacy implementation.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for applying pairwise differential privacy to variables in a data set, the method comprising:
   receiving as input, a dataset comprising a plurality of variables having values, wherein the dataset comprises human physical or biological measurement data generated by a laboratory;
   storing the values in a data table;
   identifying variables in the dataset that are correlated and storing, in a correlation preservation table, identities of the variables that are correlated;
   executing an algorithm that determines, for each variable represented by values in the data table, including a first variable represented by the values in the data table, whether the first variable is identified in the correlation preservation table, and, in response to determining that the first variable is identified in the correlation preservation table, reads, from the correlation preservation table, identities of variables that are correlated with the first variable, and assigns a random instance seed value to the first variable and the variables identified as being correlated with the first variable;
   computing values of an adaptive sensitivity parameter corresponding to values of the first variable and the variables identified as being correlated with the first variable, wherein computing the values of the adaptive sensitivity parameter includes inputting the values of the first variable and the variables identified as being correlated with the first variable into a relative sensitivity function that uses a conditional structure to compute and output the values of the adaptive sensitivity parameter, wherein the values of the adaptive sensitivity parameter vary, according to the conditional structure, with the values of the first variable and the variables identified as being correlated with the first variable;
   utilizing, by a noise generation manager, the random instance seed value and the values of the adaptive sensitivity parameter to determine, generate, and apply different amounts of additive noise to the values of the first variable and the variables identified as being correlated with the first variable to produce pseudonymized values of the first variable and the variables identified as being correlated with the first variable and which preserve correlations between the first variable and the variables identified as being correlated with the first variable, wherein the noise generation manager includes a Laplace function that receives, as inputs, the values of the first variable and the variables identified as being correlated with the first variable, the values of the adaptive sensitivity parameter, and the random instance seed value and produces, as outputs the pseudonymized values of the first variable and the variables identified as being correlated with the first variable and thereby providing pairwise differential privacy to the values of the first variable and the variables identified as being correlated with the first variable;
   communicating the pseudonymized values of the first variable and the variables identified as being correlated with the first variable from the laboratory to a computer associated with a statistics team for identifying statistical trends represented by the pseudonymized values, wherein communicating the pseudonymized values of the first variable and the variables identified as being correlated with the first variable includes communicating the pseudonymized values of the first variable and the variables identified as being correlated with the first variable from a client-side host to a data management host over a network; and
   generating, by a pseudorandom data manager implemented on the data management host, a statistical report using the pseudonymized values of the first variable and the variables identified as being correlated with the first variable, wherein the statistical report indicates statistical relationships among the pseudonymized values of the first variable and the variables identified as being correlated with the first variable that are consistent with statistical relationships among the values of the first variable and the variables identified as being correlated with the first variable in the dataset.

2. The method of claim 1 wherein identifying the variables that are correlated is performed by an operator.

3. The method of claim 2 wherein identifying the variables that are correlated includes identifying variables having a positive correlation or a negative correlation.

4. The method of claim 1 wherein the first variable and the variables identified as being correlated with the first variable are biochemical data variables associated with a common human subject.

5. The method of claim 1 wherein the adaptive sensitivity parameter scales with numerical measurement values associated with the first variable and the variables identified as being correlated with the first variable.

6. The method of claim 1 wherein the adaptive sensitivity parameter indicates a distribution range of the additive noise applied to the values of the first variable and variables identified as being correlated with the first variable.

7. The method of claim 6 wherein the adaptive sensitivity parameter is utilized to establish a magnitude of the additive noise applied to the values of the first variable and the variables identified as being correlated with the first variable.

8. The method of claim 1 wherein the noise generation manager utilizes a Laplace transform mechanism to generate the additive noise.

9. The method of claim 1 wherein the data set includes a relational database.

10. A system for applying pairwise differential privacy to variables in a data set, the system comprising:

a computing platform including at least one processor and a memory; and a pairwise differential privacy (PDP) engine that includes a correlation manager and a noise generation manager (NGM) and is stored in the memory and when executed by the at least one processor is configured to:

receive as input, a dataset comprising a plurality of variables having values, wherein the dataset comprises human physical or biological measurement data generated by a laboratory;

store the values in a data table;

store, in a correlation preservation table, identities of variables in the dataset that are correlated;

execute, by the correlation manager, an algorithm that determines, for each variable represented by values in the data table, including a first variable represented by the values in the data table, whether the first variable is identified in the correlation preservation table, and, in response to determining that the first variable is identified in the correlation preservation table, reads, from the correlation preservation table, identities of variables that are correlated with the first variable and assigns a random instance seed value to the first variable and the variables identified as being associated with the first variable;

compute, utilizing the correlation manager, values of an adaptive sensitivity parameter corresponding to values of the first variable and the variables identified as being correlated with the first variable, wherein computing the values of the adaptive sensitivity parameter includes inputting the values of the first variable and the variables identified as being correlated with the first variable into a relative sensitivity function that uses a conditional structure to compute and output the values of the adaptive sensitivity parameter, wherein the values of the adaptive sensitivity parameter vary, according to the conditional structure, with the values of the first variable and the variables identified as being correlated with the first variable and thereby providing pairwise differential privacy to the values of the first variable and the variables identified as being correlated with the first variable;

utilize, by the noise generation manager, the random instance seed value and the values of the adaptive sensitivity parameter to determine, generate, and apply different amounts of additive noise to the values of the first variable and the variables identified as being correlated with the first variable to produce pseudonymized values of the first variable and the variables identified as being correlated with the first variable, wherein the noise generation manager includes a Laplace function that receives, as inputs, the values of the first variable and the variables identified as being correlated with the first variable, the values of the adaptive sensitivity parameter, and the random instance seed value and produces, as outputs the pseudonymized values of the first variable and the variables identified as being correlated with the first variable; and communicate the pseudonymized values of the first variable and the variables identified as being correlated with the first variable from the laboratory to a computer associated with a statistics team for identifying statistical trends represented by the pseudonymized values, wherein communicating the pseudonymized values of the first variable and the variables identified as being correlated with the first variable includes communicating the pseudonymized values of the first variable and the variables identified as being correlated with the first variable from a client-side host to a data management host over a network; and a pseudorandom data manager implemented on the data management host for generating a statistical report using the pseudonymized values of the first variable and the variables identified as being correlated with the first variable, wherein the statistical report indicates statistical relationships among the pseudonymized values of the first variable and the variables identified as being correlated with the first variable that are consistent with statistical relationships among the values of the first variable and the variables identified as being correlated with the first variable in the dataset.

11. The system of claim 10 wherein the variables that are correlated are identified by an operator.

12. The system of claim 11 wherein the correlation preservation table includes identities of variables having a positive correlation and identities of variables having a negative correlation.

13. The system of claim 10 wherein the first variable and the variables identified as being correlated with the first variable are biochemical data variables associated with a common human subject.

14. The system of claim 10 wherein the adaptive sensitivity parameter scales with numerical measurement values associated with the first variable and the variables identified as being correlated with the first variable.

15. The system of claim 10 wherein the adaptive sensitivity parameter indicates a distribution range of the additive noise applied to the values of the first variable and the variables identified as being associated with the first variable.

16. The system of claim 15 wherein the adaptive sensitivity parameter is utilized to establish a magnitude of the additive noise applied to the values of first variable and the variables identified as being correlated with the first variable.

17. The system of claim 10 wherein the noise generation manager uses a Laplace transform mechanism to generate the additive noise.

18. A non-transitory computer readable medium having stored thereon executable instructions that when executed by a processor of a computer control the computer to perform a method comprising:

receiving as input, a dataset comprising a plurality of variables having values, wherein the dataset comprises human physical or biological measurement data generated by a laboratory;

storing the values in a data table;

storing, in a correlation preservation table, identities of the variables that are correlated;

executing an algorithm that determines, for each variable represented by values in the data table, including a first variable represented by the values in the data table, whether the first variable is identified in the correlation preservation table, and, in response to determining that the first variable is identified in the correlation preservation table, reads, from the correlation preservation table, identities of variables that are correlated with the first variable;

computing values of an adaptive sensitivity parameter for values of the first variable and the variables identified as being correlated with the first variable, wherein computing the values of the adaptive sensitivity parameter includes inputting the values of the first variable and the variables identified as being correlated with the first variable into a relative sensitivity function that uses a conditional structure to compute and output the values of the adaptive sensitivity parameter, wherein the values of the adaptive sensitivity parameter vary, according to the conditional structure, with the values of the first variable and the variables identified as being correlated with the first variable;

utilizing, by a noise generation manager, the random instance seed value and the values of the adaptive sensitivity parameter to determine, generate, and apply different amounts of additive noise to the values of the first variable and the variables identified as being correlated with the first variable to produce pseudonymized values of the first variable and the variables identified as being correlated with the first variable and which preserve correlations between the first variable and the variables identified as being correlated with the first variable, wherein the noise generation function includes a Laplace function that receives, as inputs, the values of the first variable and the variables identified as being correlated with the first variable, the values of the adaptive sensitivity parameter, and the random instance seed value and produces, as outputs the pseudonymized values of the first variable and the variables identified as being correlated with the first variable and thereby providing pairwise differential privacy to the values of the first variable and the variables identified as being correlated with the first variable;

communicating the pseudonymized values of the first variable and the variables identified as being correlated with the first variable from the laboratory to a computer associated with a statistics team for identifying statistical trends represented by the pseudonymized values, wherein communicating the pseudonymized values of the first variable and the variables identified as being correlated with the first variable includes communicating the pseudonymized values of the first variable and the variables identified as being correlated with the first variable from a client-side host to a data management host over a network; and generating, by a pseudorandom data manager implemented on the data management host, a statistical report using the pseudonymized values of the first variable and the variables identified as being correlated with the first variable, wherein the statistical report indicates statistical relationships among the pseudonymized values of the first variable and the variables identified as being correlated with the first variable that are consistent with statistical relationships among the values of the first variable and the variables identified as being correlated with the first variable in the dataset.

* * * * *